July 13, 1926.
W. H. MUZZY
1,592,640
INTAKE HEATING DEVICE FOR INTERNAL COMBUSTION ENGINES
Filed Jan. 7, 1921
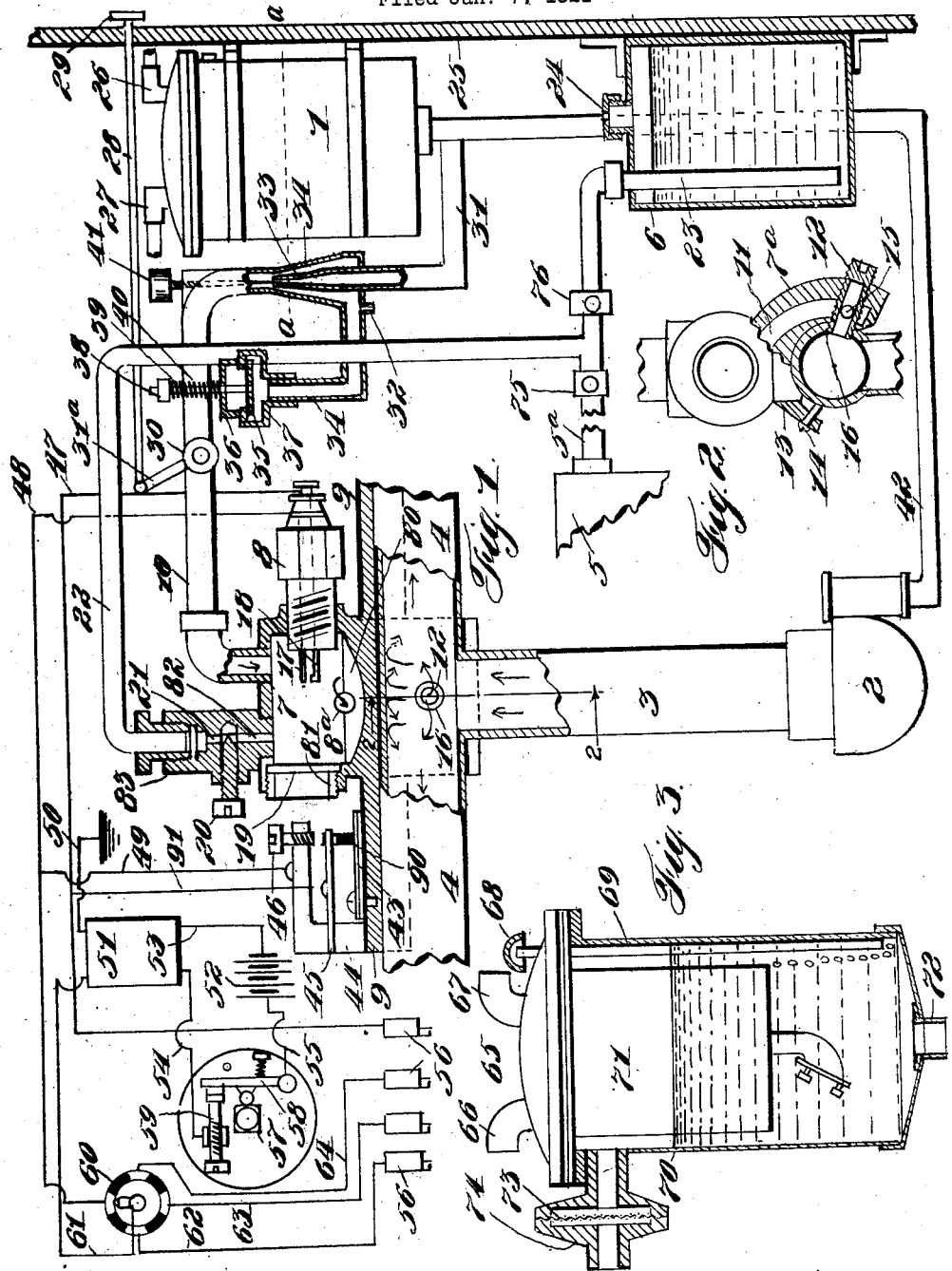
Witness
Lucy D. Stone
Inventor
William H. Muzzy Patented July 13, 1926.

1,592,640

UNITED STATES PATENT OFFICE.

WILLIAM H. MUZZY, OF CHICAGO, ILLINOIS.

INTAKE-HEATING DEVICE FOR INTERNAL-COMBUSTION ENGINES.

Application filed January 7, 1921. Serial No. 435,637.

This invention relates to improvements in intake heating devices commonly called "heater" being devices in internal combustion engines for converting liquid fuel into combustible gas, under varying conditions, for use in internal combustion engines, and particularly such engines as used in the power plants of automobiles.

The purpose of this invention is to provide a simple and efficient device for heating the intake of an internal combustion engine and for regulating the temperature, and to embody such device in a form adapted to be movably mounted upon the intake passage of internal combustion engines, particularly automobile engines, as now constructed and already in use. It consists in the elements and features of construction adapted to accomplish these purposes, herein shown and described as indicated in the claims.

In the drawings:—

Figure 1 is a partly sectional elevation of a structure embodying this invention, section being made axially with respect to the several passages and chambers most directly concerned in the invention.

Figure 2 is a detail section at the line, 2—2, on Figure 1.

Figure 3 is a vertical axial section,—except as to the cap member which is in side elevation,—of a modified construction of the vacuum tank for cooperating with the other parts according to this invention.

Described in general terms the so-called heater consists of means for heating a portion of the intake manifold of the engine independently of the heat created by the burning motive fuel in the engine itself. This means comprises a combustion chamber properly located to impart its heat to the proper part of the fuel inlet passages of the engine so that the streams or drops of fuel being drawn into the engine partly in liquid form, will impact against this heated portion and be converted into the proper gas for combustion in the engine. The principal difficulty in devices of this character has been to secure the proper mixture of fuel and air for the combustion chamber of the heater which is not under compression like the engine charge, and to also properly control the heat imparted by the heater to the manifold. The tendency of such devices is to overheat and cause an undue expansion of the fuel in the manifold and explosions in the manifold. The gases in the heater combustion chamber are being constantly re-ignited if they temporarily lose the flame, and I have taken advantage of this circumstance to obtain an intermittent burning of fuel in the heater combustion chamber by connecting it with the "vacuum tank" in such a way that the operation of the tank will first supply and then cut off a combustible mixture and thus hold down the temperature. In a modified form of the device I have provided for the vacuum tank forming the combustible charge in the outer tank or chamber and feeding this charge to the combustion chamber of the heater for burning. In either or both forms I have provided an electrical controller for cutting off the sparking in said combustion chamber and thus holding the temperature within set limits.

For certain results which I have observed, I have provided a feed of water to the said combustion chamber and a shallow sump or basin for catching any water not immediately vaporized by the flame and vaporizing it by contact with the hot metal. This feed of water also has a cooling effect on the heater and constitutes another element for controlling or holding down the temperature of the heater.

In the aforesaid drawings 1 represents a vacuum tank for feeding the fuel in a manner well known in the art from a rear tank through the pipe 26 into the upper chamber of the tank as in the Stewart form of tank covered by patent to Webb Jay No. 1,125,549 dated Jan. 19, 1915, and this patent is referred to for a more detail description of the operation of such forms of tanks. It is sufficient to say at this point that in this form of tank that is in general use today, the gasoline in the outer chamber 70 (see Figure 3 for example) rises and falls during each operation of the tank and when a heavy pull is being made on the tank, as at high speeds of the machine, the level in the outer chamber of the tank is still further depressed.

I take advantage of this fluctuating level in the tank to assist in controlling the temperature of the heater in the following manner.

By reference to Figure 1 it will be seen that the maximum operating level in the tank 1 is on line $a$—$a$ and that this line is slightly below the level of the upper end of the spray nozzle 33 of the mixing device 34 for the heater. When the level of the gasoline is at the point a—a a proper mixture of air and gasoline is drawn into the feed pipe 10 of the heater and fed to the combustion chamber 7 of the latter and there ignited, but when the level is depressed or lowered during the operation of the vacuum tank an insufficient amount of gasoline is supplied and the mixture passing into the chamber 7 so weakened that it will not be ignited by the spark plug 8 and therefore the heating of the heater will be temporarily suspended. The intermittent action of the heater holds the temperature down and as the level in the vacuum tank is lower at high speeds when more gasoline is being used, the starving action of the mixer 34 is more pronounced at high speeds at which time it is more desirable to hold the heater out of action to a greater extent as the whole engine tends to heat at such speeds. Of course this action can be regulated at will by a needle valve 41 which engages the nozzle 33 and by an adjusting nut 38 of the air valve 35 of the mixer. The mixer proper 34 is provided with a small drain orifice 32 and with an angular extension 34 which supports the circular air valve casing 37 against the upper flange of which the air valve 35 is drawn by a spring 40 surrounding a rod 39. This rod is connected to the valve 35, passes through a guiding yoke 36 of the valve casing and is provided with an adjusting nut 38 for controlling the tension of the spring 40 in a manner well known in the art. Any surplus gasoline that at any time is drawn into the mixer is discharged through the drain 32. If at any time it is desired to cut off the action of the heater altogether, a shut-off cock 30 is moved to close the pipe 10. This cock is operated by an arm 31ª connected to a rod 28 passing through the dash board 25 and provided with an operating head 29. The action of the mixer 34 is of course like the well known action of carbureters or mixing valves having adjustable jets and adjustable air valves.

The combustible gas, as before stated, is conducted through the pipe 10 to the combustion chamber 7 of the heater being moved forward by the suction from the manifold of the engine. This suction is created through a passage formed in a screw plug 12, having a lateral port 15, and screwed through an aperture 16 cut and threaded in the horizontal portion of the engine manifold 3. The plug also screws through a rear extension 7ª of the heater, which extension is formed with a passage 11 communicating with the port 15 and by a port 8ª with the combustion chamber 7 formed in the heater. These several ports communicating with the manifold are small so that no great part of the vacuum of the manifold will be effected. Laterally extending heating plates 9 are formed on each side of the heater and lay close down upon the top of the horizontal portion of the manifold to impart their heat to the latter.

The bottom of the combustion chamber 7 is formed with a depression 80 arranged to catch any surplus water fed from the orifice 82 in a plug attachment 83 screwed into the top of the combustion chamber. A needle valve 20 controls the passage of the water through the orifice 82. A pipe 22 connects the plug 83 with a water tank 6 suitably secured to the dash 25 and having a filler cap 24, a cock 76 being mounted in the pipe to shut off the water from this source when it is desired to draw the supply of water from the engine jacket 5 through a branch pipe 5ª provided with a similar shut-off cock 75. The water is drawn to the combustion chamber 7 by the suction of the engine and there turned to steam. The adjustment should be such that more steam is created than is absorbed so that the surplus will pass into the manifold and thus to the engine to assist in its combustion. At such times as when the flame in the firing chamber 7 is extinguished the water caught in the depression 80 will turn to steam and be fed to the engine and will at the same time tend to cool the heater. A glass window 19 is mounted, by a screw threaded ring 81, in the end of the combustion chamber, 7, so that the nature of the flame in the chamber may be observed and changed by the different adjustments. The spark plug 8 which projects into the firing chamber is screwed into position in the usual manner and has two insulated electrodes or firing points 17 and 18, the plug having no "ground" and being of the insulated variety well known on the market and in the art. The two electrodes 17 and 18 are connected to wires 48 and 47 respectively. The wire 48 is connected to one of the contact plates of the distributer 60 of the engine. The remaining wire 47 is connected to one of the regular grounded spark plugs 56 of the engine, the remaining plugs of the engine being connected to their respective distributer segments by wires 62, 63 and 64. The moving contact of the distributer is connected by a wire 61 to the induction coil 51, the remaining wire 50 of the secondary being grounded in a manner well known in the art. The primary wires 53 and 54 of the coil are connected to the battery 52 and to the adjusting screw 59 of the make and break device which is connected to the engine. A wire 55 also connects the battery to the moving arm 58 of the make and break device which is operated by the cam 57 connected to the engine. This operation of the make and break device and the distributer is old and well known in the art.

In order to further control the temperature of the heater I provide one of the extensions of the same with a plate 43 composed of two plates of metal brazed or soldered together and having different expansions under heat. This plate is secured to one of the extensions 9 so as to lie flat thereon and is provided with an insulating block 90 which when the plate curls upward at one end under the action of the heat, will force a contact plate 45 upward into contact with a contact screw 46, the screw and plate being mounted in the insulated block 44. The plate 45 is connected by a wire 91 with the wire 47 while the screw 46 is connected by a wire 49 with the wire 48.

By this means when the heat of the heater causes the plate 43 to bend upward the wires 47 and 48 are connected by a shunt circuit and the plug 8 is cut out and combustion ceases in the chamber 7.

The action of heaters of the type herein described is more or less like a series of consecutive explosions of small volume and the continuous action of the plug 8 is necessary to fire the successive charges drawn into the firing chamber. These explosions are so close together however that the flame in the firing chamber appears to be continuous, but if the current from the plug 8 is cut off the firing ceases.

In the modified form of my invention shown in Figure 3 I employ the ordinary form of vacuum tank before mentioned but provide the outer chamber 70 with a pendent air or atmosphere tube 69 which extends down into the chamber to near the bottom of the same. The outlet 72 to the carbureter is the same as the outlet 42 of the tank shown in Figure 1. The supply to the pipe 10 in this instance however is through a fine screen 73 mounted in a casing 74 secured to the upper part of the outer tank 70 and communicating therewith. The upper part of the pipe 69 is provided with a cap 68 which allows air to enter freely but prevents water, dust or dirt dropping down the pipe.

The suction through the pipe 10 in this instance causes air to pass down the pipe 69 which is submerged, and to rise in bubbles through the gasoline. The air is thus laden with gas and is fed through the pipe 10 to the heater. The suction necessary to cause the air to pass down the pipe 69 is not sufficient to prevent the feed of gasoline by gravity from the shell 70 to the carbureter 2 below it.

From the foregoing description it will be seen that I have provided a heater which may be attached to engines already in use without changing the manifold, the carbureter or the water system of the machine. In such devices at present in use it is necessary to have a special carbureter and a special water jacketed manifold to control the heat.

With the present devices the heat is controlled during normal operations and if it gets too high under these conditions the action of the heater is suspended automatically and as it cools down is again thrown into action so that a uniform temperature is maintained at all times. This temperature may be adjusted to suit the seasons by the adjustment of the screw 46 which will cut out the plug at a greater or less heat.

When the engine is being first started it is sometimes desirable to close the pipe 10 so that the engine will draw a richer mixture at this time to start more readily, and I do this by the dash control before described.

It will be seen by reference to Figure 1 of the drawings that upwardly moving gases from the carbureter 2 will strike against the top of the horizontal portion of the manifold immediately below the heater and its extensions. These currents are laden often with solid fuel and as this fuel strikes the heated surfaces it is turned to gas or is at least vaporized and thus enters the engine.

At the highest speed of the engine the heater cuts out automatically as the suction in the manifold drops so low that the mixture for the chamber 7 is no longer fed. The heater is not needed under such conditions however as the engine soon becomes overheated of its own heat. This is only a racing condition and is not often met in actual practice.

Having thus described my invention what I claim as new and desire to secure by Letters Patent is:

1. In combination with an internal combustion engine having a gravity-fed carbureter and a fuel chamber connected for supplying the carbureter by gravity; a heater for heating the engine intake passage, comprising a combustion chamber, and means for supplying a combustible mixture to said chamber by the suction of the engine, said means comprising a suction conduit from the engine intake which does not include the mixing passage of the carbureter; an air conduit leading to said combustion chamber and a fuel nozzle connected for fuel supply with the gravity supply of the carbureter, said nozzle terminating in said air conduit at a level above the high liquid level of the gravity supply.

2. In combination with an internal combustion engine, a heater for heating the engine intake passage, consisting of a metal body adapted to be mounted in contact with said intake passage for communicating heat thereto by conduction, said body having a combustion chamber; means for supplying a combustible mixture to said combustion chamber, and means for igniting the same therein; means operated by the suction of the engine for supplying water to said chamber restrictedly, and a passage from said combustion chamber for delivering the products of combustion into the engine intake passage for mingling with the motive fuel fluid therein, the combustion chamber of the heater having at the bottom a sump for receiving water in excess of that which is vaporized by contact with the hot wall of the combustion chamber, the discharge connection from said combustion chamber to the engine intake passage being at a point above the water-holding space of said sump for preventing the passage of water unvaporized into the engine intake.

3. In an internal combustion engine having motive fluid supplying means consisting of fuel-mixture-forming means and a conduit for the same leading to the engine intake, in combination with said motive fluid supplying means, an additional combustible mixture forming device and a conduit leading independently of the motive-fluid-supplying means to the engine intake, and means for igniting said combustible mixture on its way to the engine intake anterior to its discharge thereat, the conduit for the combustible mixture comprising a combustion chamber; the means for igniting the combustible mixture being operated for such ignition in said combustion chamber; means operated by the engine suction for discharging water onto a wall of said combustion chamber for regulating the temperature thereof, and means independent of the engine suction for controlling said water discharge.

4. In an internal combustion engine having motive fluid supplying means consisting of fuel-mixture-forming means and a conduit for the same leading to the engine intake, in combination with said motive fluid supplying means, an additional combustible mixture forming device and a conduit leading independently of the motive-fluid-supplying means to the engine intake, and means for igniting said combustible mixture on its way to the engine intake anterior to its discharge thereat, the conduit for the combustible mixture comprising a combustion chamber; the means for igniting the combustible mixture being operated for such ignition in said combustion chamber; a suction connection from said chamber to the engine intake passage independent of the carburetor passage; a water supply and connection therefrom to said combustion chamber, said water supply being at a lower level than said chamber, whereby the water may be lifted by the engine sucton for discharge to said chamber, the engine suction connection to said chamber being by a restricted passage, and a valve for restricting the water connection with said combustion chamber.

In witness whereof, I hereunto subscribe my name this 15th day of November, A. D. 1920.

WILLIAM H. MUZZY.